United States Patent
Zhao

(10) Patent No.: US 12,052,732 B2
(45) Date of Patent: Jul. 30, 2024

(54) PARAMETER SET ACQUISITION METHOD AND DEVICE

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 680 days.

(21) Appl. No.: 17/265,404

(22) PCT Filed: Aug. 3, 2018

(86) PCT No.: PCT/CN2018/098506
§ 371 (c)(1),
(2) Date: Feb. 2, 2021

(87) PCT Pub. No.: WO2020/024257
PCT Pub. Date: Feb. 6, 2020

(65) Prior Publication Data
US 2021/0243754 A1    Aug. 5, 2021

(51) Int. Cl.
*H04W 72/51* (2023.01)
*H04L 5/00* (2006.01)
(Continued)

(52) U.S. Cl.
CPC ......... *H04W 72/51* (2023.01); *H04W 72/044* (2013.01); *H04W 72/23* (2023.01)

(58) Field of Classification Search
CPC ... H04W 72/51; H04W 72/044; H04W 72/23; H04W 76/14; H04W 88/04; H04W 92/18;
(Continued)

(56) References Cited

U.S. PATENT DOCUMENTS

| 9,736,875 B2 | 8/2017 | Wietfeldt et al. |
| 9,900,772 B2 | 2/2018 | Vannithamby et al. |

(Continued)

FOREIGN PATENT DOCUMENTS

| CN | 103686585 A | 3/2014 |
| CN | 104811909 A | 7/2015 |

(Continued)

OTHER PUBLICATIONS

Extended European Search Report issued Jun. 29, 2021 in corresponding European Patent Application No. 18928913.5, 9 pages.

(Continued)

*Primary Examiner* — Inder P Mehra
(74) *Attorney, Agent, or Firm* — Oblon, McClelland, Maier & Neustadt, L.L.P.

(57) ABSTRACT

Aspects of the disclosure can provide a parameter set acquisition method and device. The method can include acquiring a target parameter set corresponding to information to be transmitted. The information to be transmitted can have at least one of the following information types: synchronization signal, direct link broadcast information, physical layer control information or user data. The method can further include using the target parameter set to transmit the information to be transmitted.

18 Claims, 6 Drawing Sheets acquiring module 501 transmitting module 502

(51) Int. Cl.
*H04W 4/06* (2009.01)
*H04W 4/40* (2018.01)
*H04W 4/46* (2018.01)
*H04W 56/00* (2009.01)
*H04W 72/044* (2023.01)
*H04W 72/0446* (2023.01)
*H04W 72/0453* (2023.01)
*H04W 72/20* (2023.01)
*H04W 72/23* (2023.01)
*H04W 88/04* (2009.01)
*H04W 92/18* (2009.01)

(58) Field of Classification Search
CPC ....... H04W 56/002; H04W 4/06; H04W 4/40; H04W 24/02; H04W 56/00; H04W 72/0446; H04W 72/0453; H04W 72/20; H04W 4/46; H04L 27/261; H04L 5/0044; H04L 5/0092
USPC .......................................................... 370/330
See application file for complete search history.

(56) References Cited

U.S. PATENT DOCUMENTS

| | | | |
|---|---|---|---|
| 9,924,495 B2 | 3/2018 | Wang et al. | |
| 9,954,587 B2 | 4/2018 | Zhu et al. | |
| 10,153,816 B2 | 12/2018 | Bangolae et al. | |
| 10,164,693 B2 | 12/2018 | Koc et al. | |
| 2008/0285522 A1* | 11/2008 | Ma | H04W 52/248 370/335 |
| 2009/0157496 A1* | 6/2009 | Davis | G06Q 30/0264 705/1.1 |
| 2015/0063188 A1* | 3/2015 | Kanesalingam | H04L 12/1881 370/312 |
| 2016/0044690 A1 | 2/2016 | Li et al. | |
| 2016/0057636 A1 | 2/2016 | Ibrahim et al. | |
| 2016/0113050 A1 | 4/2016 | Li et al. | |
| 2016/0157095 A1 | 6/2016 | Zhang et al. | |
| 2016/0337103 A1* | 11/2016 | Kim | H04W 72/21 |
| 2016/0353410 A1 | 12/2016 | Wang et al. | |
| 2018/0167989 A1 | 6/2018 | Yasukawa et al. | |
| 2019/0191381 A1* | 6/2019 | Zhang | H04W 52/08 |
| 2019/0223178 A1* | 7/2019 | Bergström | H04W 72/0446 |
| 2019/0229853 A1 | 7/2019 | Lee et al. | |
| 2019/0386803 A1* | 12/2019 | Cai | H04W 72/02 |
| 2020/0022089 A1 | 1/2020 | Guo | |
| 2021/0013997 A1 | 1/2021 | Liu | |
| 2021/0092688 A1 | 3/2021 | Guo | |

FOREIGN PATENT DOCUMENTS

| | | | | |
|---|---|---|---|---|
| CN | 105103609 A | | 11/2015 | |
| CN | 104811909 B | | 9/2019 | |
| EP | 3174350 A4 | * | 3/2018 | ........ H04W 36/0061 |
| WO | WO 2017/026477 A1 | | 2/2017 | |
| WO | WO 2017/195862 A1 | | 11/2017 | |
| WO | WO 2018/008459 A1 | | 1/2018 | |
| WO | WO 2018/084608 A2 | | 5/2018 | |
| WO | WO 2018/121355 A1 | | 7/2018 | |
| WO | WO 2019/196828 A1 | | 10/2019 | |
| WO | WO 2020/013641 A1 | | 1/2020 | |

OTHER PUBLICATIONS

Indian Office Action issued Jan. 21, 2022 in Indian Patent Application No. 202147008803, 6 pages.
Japanese Office Action issued Mar. 29, 2022 in Japanese Patent Application No. 2021-505876 (with English translation), 10 pages.
International Search Report issued on Apr. 19, 2019 in PCT/CN2018/098506 filed on Aug. 3, 2018, 3 pages.
Combined Russian Office Action and Search Report issued Sep. 16, 2021 in Russian Patent Application No. 2021105209/07 (with English translation), 12 pages.

* cited by examiner

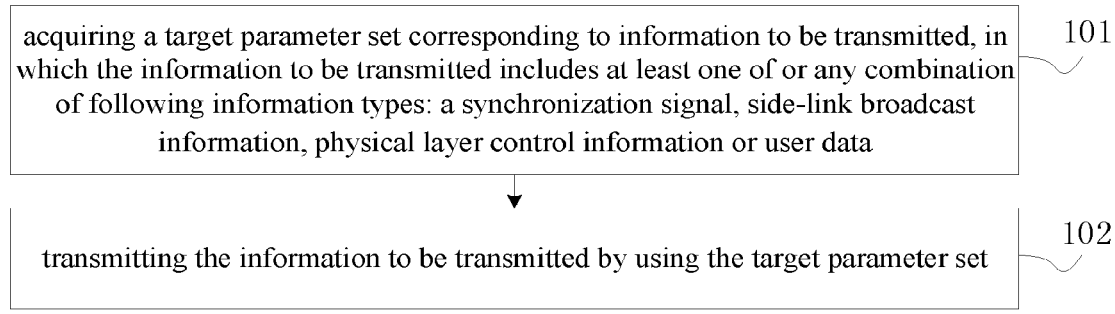

FIG. 1 receiving a synchronization signal or side-link broadcast information sent by a peer-end device — 201 determining a parameter set used by the peer-end device to transmit physical layer control information and/or user data based on the synchronization signal or the side-link broadcast information — 202 determining the parameter set as a target parameter set for the user equipment to transmit the information to be transmitted — 203 using the target parameter set to transmit the information to be transmitted — 204

FIG. 2

PARAMETER SET ACQUISITION METHOD AND DEVICE

CROSS-REFERENCE TO RELATED APPLICATION

This application is a U.S. national phase application of International Application No. PCT/CN2018/098506, filed on Aug. 3, 2018, which is incorporated herein by reference in its entirety.

TECHNICAL FIELD

The present disclosure relates to a field of communication technologies, including to a method for acquiring a parameter set and a device for acquiring a parameter set.

BACKGROUND

Emergence of new Internet applications has brought high requirements for wireless communication technologies, thus the wireless communication technologies are continuously developed to meet the requirements of applications. Currently, cellular mobile communication technologies are in an evolution stage of a new generation of technology. Vehicle to Everything (V2x) includes Vehicle to Vehicle (V2V), Vehicle to Pedestrian (V2P), and Vehicle to Infrastructure (V2I). V2P refers to a communication between vehicle-mounted equipment and handheld equipment, V2I refers to a communication between vehicle-mounted equipment and roadside equipment. The Internet of Vehicles (IoV) supports V2V, V2I, and V2P communications, which effectively improves traffic safety and traffic efficiency, and enriches people's travel experience.

Taking into account that existing cellular communication technologies support IoV communications, existing base station deployments could be used to effectively reduce equipment overhead, and it is also more conducive to providing services with Quality of Service (QoS) guarantees to meet the requirements of IoV services. Therefore, LTE Rel-14/15 provides a support for V2x communication based on the cellular network, that is, cellular based V2x (C-V2x) communication. In C-V2x, the communication between the vehicle-mounted equipment and another equipment is transferred through the base station and the core network, that is, the communication link between the user equipment and the base station in the original cellular network is used for communication, and the communication could also be directly performed through side-link (SL) between the equipments.

Compared to the cellular communication, the side-link communication has characteristics of short delay and low overhead, and is very suitable for the direct communication between the vehicle-mounted equipment and another peripheral equipment that is close to a geographical position of the vehicle. V2x side-link communication in LTE can only support some basic security applications of V2x, such as exchanging Cooperative Awareness Messages (CAM), Decentralized Environmental Notification Message (DENM) or other information, speech broadcasting and the like. With the development of autonomous driving technologies, in order to support new V2x services, new requirements have been put forward for the performance of V2x technologies. The use of 5G New Radio (NR) technologies to support new V2x communication services and scenarios is considered as an important content of Rel16 by the 3rd Partnerships Project (3GPP) on mobile communication, and new business requirements that need to be met by the V2x communication have been proposed, including vehicles platooning, extended sensors, advanced driving, and remote driving. In general, NR V2x side-link needs to achieve more reliable communication quality at a fast communication speed with a short communication delay.

In the related art, in the LTE V2x communication technologies, a subcarrier interval during the side-link communication between the user equipments is fixed at 15 KHz, and a sub-frame length is fixed at 1 ms.

SUMMARY

Embodiments of the present disclosure provide a method for acquiring a parameter set and a device for acquiring a parameter set. The technical solutions will be described as follows.

In a first aspect, the disclosure can provide a method for acquiring a parameter set, which is applicable to a user equipment for a side-link communication. The method can include acquiring a target parameter set corresponding to information to be transmitted. The information to be transmitted includes at least one of or any combination of following information types: a synchronization signal, side-link broadcast information, physical layer control information or user data. The method can further include transmitting the information to be transmitted by using the target parameter set.

In a second aspect, the disclosure can provide a device for acquiring a parameter set. The device can include an acquiring module and a transmitting module. The acquiring module is configured to acquire a target parameter set corresponding to information to be transmitted, in which the information to be transmitted includes at least one of or any combination of following information types: a synchronization signal, side-link broadcast information, physical layer control information or user data. The transmitting module is configured to transmit the information to be transmitted by using the target parameter set.

In a third aspect, the disclosure can provide a device for acquiring a parameter set. The device can include a processor and a memory configured to store instructions executable by the processor. The processor is configured to acquire a target parameter set corresponding to information to be transmitted. The information to be transmitted includes at least one of or any combination of following information types: a synchronization signal, side-link broadcast information, physical layer control information or user data. The processor can be further configured to transmit the information to be transmitted by using the target parameter set.

In a fourth aspect, the disclosure can provide a non-transitory computer-readable storage medium storing computer instructions. When the instructions are executed, a processor is caused to implement the method according to the first aspect of the disclosure.

It is to be understood that both the foregoing general description and the following detailed description are exemplary and explanatory only, and are not restrictive of the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

FIG. 1 is a flowchart of a method for acquiring a parameter set according to an exemplary embodiment.

FIG. 2 is a flowchart of a method for acquiring a parameter set according to an exemplary embodiment.

DETAILED DESCRIPTION

Figure 3:
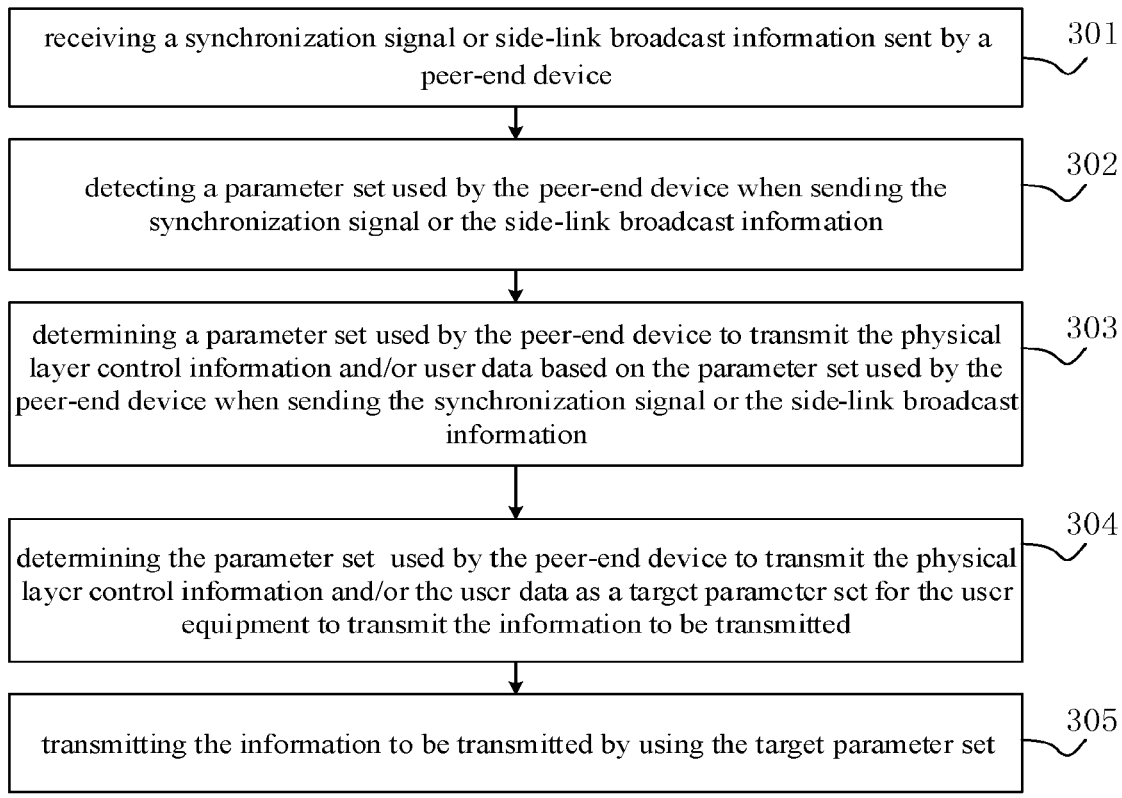
FIG. 3 is a flowchart of a method for acquiring a parameter set according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the related art, a sub-carrier interval of the LTE V2x side-link communication is fixed at 15 KHz, and a subframe length is fixed at 1 ms, so that the LTE V2x side-link communication only supports some basic security applications of V2x, such as exchanging Cooperative Awareness Messages (CAM), Decentralized Environmental Notification Message (DENM) or other information, speech broadcasting or the like.

Meanwhile, the NR V2x side-link communication needs to support V2x services such as vehicles platooning, extended sensors, advanced driving, and remote driving. Different V2x services have different requirements for communication rate, communication delay, communication quality and communication distance, which requires NR V2x side-link technologies to be able to counter the Doppler effect under a high-speed movement, counter carrier frequency offset under a high frequency, and obtain a low delay, while ensuring a performance in low-speed driving and obtaining a greater transmission distance. However, in the related art, since the LTE V2x side-link communication adopts a fixed subcarrier interval and a fixed subframe length, the differentiated QoS requirements for the NR V2x side-link communication services cannot be guaranteed, and the user experience is poor.

The embodiments of the present disclosure provide a method for acquiring a parameter set, which is applied to a user equipment for a side-link communication. The method can include acquiring a target parameter set corresponding to information to be transmitted, in which the information to be transmitted includes at least one of or any combination of following information types: a synchronization signal, side-link broadcast information, physical layer control information or user data. The method can further include transmitting the information to be transmitted by using the target parameter set. The method for acquiring a parameter set according to the embodiments of the present disclosure provides differentiated parameter sets for different V2x side-link communications by supporting various parameter set configurations in the NR V2x side-link communications, which may ensure differentiated QoS requirements for NR V2x side-link communication services and improve user experience.

Based on the above analysis, the following specific embodiments are proposed.

FIG. 1 is a flowchart of a method for acquiring a parameter set according to an example embodiment. The method can be applied to a user equipment for a side-link communication. As illustrated in FIG. 1, the method can include the following steps 101-102.

At block 101, a target parameter set corresponding to information to be transmitted is obtained, and the information to be transmitted includes at least one of or any combination of following information types: a synchronization signal, side-link broadcast information, physical layer control information or user data. For example, an execution subject of the method may be a user equipment (UE), such as a vehicle-mounted device, a roadside device, or a user handheld device in the side-link communication.

Further, the parameter set may include values of a series of parameters such as subcarrier interval and corresponding time domain modulation symbol length, cyclic prefix (CP) length, and time slot length. The target parameter set corresponding to the information to be transmitted may be a sending parameter set for sending the information to be transmitted and/or a receiving parameter set for receiving the information to be transmitted.

For example, the present disclosure supports different parameter set configurations in the NR V2x side-link communication. The implementation of acquiring the target parameter set corresponding to the information to be transmitted may at least include any one or combination of the following methods.

In Method 1, the user equipment obtains different parameter set configurations used by the user equipment during the V2x side-link communication from a base station or a server in advance.

In Mode a), for the NR V2x side-link communication, the user equipment semi-statically obtains an available sending parameter set and/or receiving parameter set by receiving a configuration message sent by the base station. For example, the configuration message sent by the base station includes the target parameter set used by the user equipment for transmitting the information to be transmitted, and the user equipment obtains the target parameter set corresponding to the information to be transmitted by parsing the configuration message.

In Mode b), for the NR V2x side-link communication, the user equipment dynamically obtains the target parameter set used to transmit the information to be transmitted by receiving a downlink control message sent by the base station. For example, the downlink control message sent by the base station includes the target parameter set used by the user equipment for transmitting the information to be transmitted, and the user equipment obtains the target parameter set corresponding to the information to be transmitted by parsing the downlink control message.

For example, the downlink control message sent by the base station includes the parameter set used by the user equipment for a next transmission of physical layer control information and/or user data. The user equipment parses the downlink control message to obtain the parameter set for transmitting the physical layer control information and/or the user data. It should be noted that when the parameter set obtained by the user equipment from the base station conflicts with a pre-configured parameter set, the user equipment may use the parameter set obtained from the base station to transmit the information to be transmitted.

In Method 2, the user equipment is pre-configured with different parameter set configurations used by the user equipment during the V2x side-link communication.

In Mode 1), for different carrier frequency bands used when the user equipment receives/sends communication information, different parameter sets are configured for different carrier frequency bands in advance to establish a correspondence between the carrier frequency bands and the parameter sets. The user equipment obtains a target carrier frequency band used for transmitting the information to be transmitted, and obtains the target parameter set corresponding to the target carrier frequency band based on the preset correspondence between the carrier frequency bands and the parameter sets. For example, the user equipment is configured with the following information in advance: when the carrier frequency is f1, the parameter set is configured as: {a subcarrier interval of 30 KHz, SC-FDMA modulation, CP of a normal length, and a time slot length of 0.5 ms}: when the carrier frequency is f2, the parameter set is configured as: {a subcarrier interval of 60 KHz, OFDM modulation, extended CP, a time slot length of 0.25 ms}.

In Mode 2), for different information types of the information to be transmitted, different parameter sets can be configured for different information types in advance, so as to establish a correspondence between the information types and the parameter sets. The user equipment obtains the target parameter set corresponding to the information to be transmitted based on the preset correspondence between the information to be transmitted and the parameter sets. The information to be transmitted includes at least one of or any combination of following information types: a synchronization signal, side-link broadcast information, physical layer control information or user data. For the synchronization signal, the side-link broadcast information, the physical layer control information and the user data, the user equipment is configured with different sending/receiving parameter sets. For example, the parameter set used to transmit the synchronization signal is configured as: {a subcarrier interval of 15KHZ, SC-FDMA modulation, CP of a normal length, a time slot length of 1 ms}. The parameter set used to transmit the physical layer control information is configured as: {a subcarrier interval of 30 KHz, SC-FDMA modulation, CP of a normal length, a time slot length of 0.5 ms}. The parameter set used to transmit the user data is configured as: {a subcarrier interval of 60 KHz, FDM modulation, CP of a normal length, a time slot length of 0.25 ms}.

In Mode 3), for the information to be transmitted of the same information type, different parameter sets can be configured for different time-frequency resource sets in advance to establish a correspondence between the time-frequency resource sets and the parameter sets. The user equipment obtains the time-frequency resource set used for transmitting the information to be transmitted, and obtains the target parameter set corresponding to the time-frequency resource set based on the preset correspondence between the time-frequency resource sets and the parameter sets.

In Method 3, the user equipment obtains different parameter set configurations used by the user equipment during the V2x side-link communication from a peer-end device. For the NR V2x side-link communication, the synchronization signal/side-link broadcast information sent by the peer-end device that performs the V2x side-link communication with the user equipment may include information on the parameter set used by the peer-end device to transmit the physical layer control information and/or the user data. The user equipment can receive the synchronization signal/side-link broadcast information sent by the peer-end device, and determine the parameter set used by the peer-end device to transmit the physical layer control information and/or the user data based on the synchronization signal or the side-link broadcast information sent by the peer-end device, that is, the user equipment obtains the parameter set used by the peer-end device to transmit the physical layer control information and/or the user data, determines the parameter set as the target parameter set for the user equipment to transmit the information to be transmitted, and uses the target parameter set to transmit the information to be transmitted, in which the information to be transmitted is, for example, the physical layer control information and/or the user data. For example, the user equipment uses the target parameter set to receive the physical layer control information and/or the user data sent by the peer-end device, and/or the user equipment uses the target parameter set to send the physical layer control information and/or the user data to the peer-end device. For another example, the user equipment uses the target parameter set to receive the physical layer control information and/or the user data sent by a device other than the peer-end device, and/or the user equipment uses the target parameter set to send the physical layer control information and/or the user data to the device other than the peer-end device.

For example, the specific implementation for the user equipment to determine the parameter set used by the peer-end device to transmit the physical layer control information and/or the user data based on the synchronization signal or the side-link broadcast information sent by the peer-end device may include any of the following ways.

In way A, the user equipment detects the parameter set used by the peer-end device when sending the synchronization signal or the side-link broadcast information, and determines the parameter set used by the peer-end device to transmit the physical layer control information and/or the user data based on the parameter set used by the peer-end device when sending the synchronization signal or the side-link broadcast information.

Since the parameter set used by the peer-end device to send the physical layer control information and/or the user data depends on the parameter set used by the peer-end device to send the synchronization signal/or the side-link broadcast information, the parameter set used by the peer-end device to transmit the physical layer control information and/or the user data can be determined based on the parameter set used by the peer-end device when sending the synchronization signal or the side-link broadcast information. Alternatively, the user equipment is pre-configured with information on the parameter set used by the peer-end device to transmit the physical layer control information and/or the user data.

In way B, for the parameter sets used by the peer-end device to transmit different physical layer control information and/or user data, different synchronization signal sequences or different reference sequences of broadcast information could be adopted, and a preset correspondence between the synchronization signal sequence or the reference sequence of side-link broadcast information and the parameter set can be established in advance. The user equipment acquires a synchronization signal sequence or a reference sequence of side-link broadcast information used by the peer-end device based on the synchronization signal or the side-link broadcast information sent by the peer-end device; and determines the parameter set used by the peer-end device to transmit the physical layer control information and/or the user data based on the preset correspondence between the synchronization signal sequence or the reference sequence of side-link broadcast information and the parameter set.

In way C, the synchronization signal or the side-link broadcast information sent by the peer-end device includes first indication information indicating the parameter set used by the peer-end device to transmit the physical layer control information and/or the user data. The user equipment parses the synchronization signal or the side-link broadcast information sent by the peer-end device, to obtain the parameter set used by the peer-end device to transmit the physical layer control information and/or the user data.

For example, specific bits in the side-link broadcast information are used to indicate parameter sets corresponding to different physical layer control information/user data. For example, in a pre-configuration, four available parameter sets are configured for the physical layer control information/user data, and two bits in the side-link broadcast information are used to indicate which parameter set is used. Alternatively, the number of the indication bits in the side-link broadcast information is determined according to the number of candidate parameter sets configured in the pre-configuration.

For another example, a time/frequency resource set that can be used by the physical layer control information/user data and a parameter set corresponding to the time/frequency resource set are indicated in the side-link broadcast information. For example, the designated frequency resource range RB 0-24 in the side-link broadcast information is configured as resource set 1 corresponding to parameter set 1, and the frequency resource range 25-49 is configured as resource set 2 corresponding to parameter set 2. Then the physical layer control information/user data that uses the time-frequency resources in the resource set 1 needs to use the parameter set 1, and the physical layer control information/user data that uses the time-frequency resources in the resource set 2 needs to use the parameter set 2.

In Method 4, the user equipment receives a synchronization signal or side-link broadcast information sent by a peer-end device, when the user equipment determines the synchronization signal sent by the peer-end device as a synchronization reference signal for the user equipment to send signals, the parameter set used by the peer-end device to send the synchronization signal or the side-link broadcast information is determined as the target parameter set used by the user equipment to send the synchronization signal or the side-link broadcast information. For example, if user equipment 2 simultaneously receives synchronization signals or side-link broadcast information sent by user equipment 1 and user equipment 4 respectively, assuming that user equipment 2 selects the synchronization signal sent by user equipment 1 as the synchronization reference signal for user equipment 2 to send signals, the parameter set used by user equipment 2 to send the synchronization signal or the side-link broadcast information to user equipment 3 other than user equipment 1 and user equipment 4 is the same as the parameter set used by user equipment 1 to send the synchronization signal or the side-link broadcast information.

In Method 5, the user equipment receives physical layer control information sent by a peer-end device, the physical layer control information carries second indication information indicating a parameter set used when transmitting user data and/or feedback information. The physical layer control information is parsed to obtain the target parameter set used by the user equipment when transmitting the user data and/or the feedback information.

For example, the physical layer control information (i.e., side-link control information) in the side-link communication includes, but is not limited to, Scheduling Allocation (SA) control information that indicates the time-frequency resources and modulation and coding schemes used by the user equipment to transmit the user data. The physical layer control information may implicitly indicate the parameter set used when transmitting the user data and/or the feedback information, for example, by selecting different reference signal sequences; or the physical layer control information may explicitly indicate the parameter set used when transmitting the user data and/or the feedback information, for example, the physical layer control information includes 2 bits. For different values "00", "01", "10", and "11" of the 2bits, the sub-carrier interval in the parameter set used for user data transmission can be 30 KHZ, 60 KHz, 120 KHz, and 240 KHz, respectively.

Alternatively, the second indication information may be used to indicate a parameter set used by the peer-end device to send the user data, may also be used to indicate a parameter set used by the user equipment to send the user data, and may also be used to indicate a parameter set used by the user equipment to send the feedback information to the peer-end device.

At block 102, the target parameter set is used to transmit the information to be transmitted. For example, after acquiring the target parameter set corresponding to the information to be transmitted, the user equipment uses the target parameter set to receive and/or send the information to be transmitted.

In the technical solution according to the embodiments of the present disclosure, by supporting various parameter set configurations in the NR V2x side-link communications and transmitting the information to be transmitted using the target parameter set corresponding to the information to be transmitted, differentiated parameter sets can be provided for different V2x side-link communications, which may guarantee differentiated QoS requirements for NR V2x side-link communication services and improve user experience.

FIG. 2 is a flowchart of a method for acquiring a parameter set according to an example embodiment. As illustrated in FIG. 2, based on the embodiments described with reference to FIG. 1, the method for acquiring a parameter set may include the following steps 201-204.

At block 201, a synchronization signal or side-link broadcast information sent by a peer-end device is received.

At block 202, a parameter set used by the peer-end device to transmit physical layer control information and/or user data is determined based on the synchronization signal or the side-link broadcast information.

At block 203, the parameter set is determined as a target parameter set for the user equipment to transmit the information to be transmitted.

At block 204, the target parameter set is used to transmit the information to be transmitted. For example, the information to be transmitted includes at least one of or any combination of following information types: a synchronization signal, side-link broadcast information, physical layer control information or user data.

In the technical solution according to the embodiments of the present disclosure, the user equipment obtains the target parameter set used by the user equipment to transmit the information to be transmitted during the V2x side-link communication from the peer-end device, so as to provide differentiated parameter sets for different V2x side-link communications, which may guarantee differentiated QoS requirements for NR V2x side-link communication services and improve user experience.

FIG. 3 is a flowchart of a method for acquiring a parameter set according to an example embodiment. As illustrated in FIG. 3, based on the embodiments described with reference to FIG. 1, the method for acquiring a parameter set may include the following steps 301-305.

At block 301, a synchronization signal or side-link broadcast information sent by a peer-end device is received.

At block 302, a parameter set used by the peer-end device when sending the synchronization signal or the side-link broadcast information is detected.

At block 303, a parameter set used by the peer-end device to transmit physical layer control information and/or user data is determined based on the parameter set used by the peer-end device when sending the synchronization signal or the side-link broadcast information.

At block 304, the parameter set used by the peer-end device to transmit the physical layer control information and/or the user data is determined as a target parameter set for the user equipment to transmit the information to be transmitted.

At block 305, the target parameter set is used to transmit the information to be transmitted.

In the technical solution according to the present disclosure, the parameter set used by the peer-end device to send the physical layer control information and/or the user data depends on the parameter set used by the peer-end device to send the synchronization signal/or the side-link broadcast information. Therefore, the user equipment may determine the parameter set used by the peer-end device to transmit the physical layer control information and/or the user data based on the parameter set used by the peer-end device when sending the synchronization signal or the side-link broadcast information, and further determine the target parameter set used by the user equipment to transmit the information to be transmitted, so as to provide differentiated parameter sets for different V2x side-link communications, and to ensure the differentiated QoS requirements for NR V2x side-link communication services.

Figure 4:
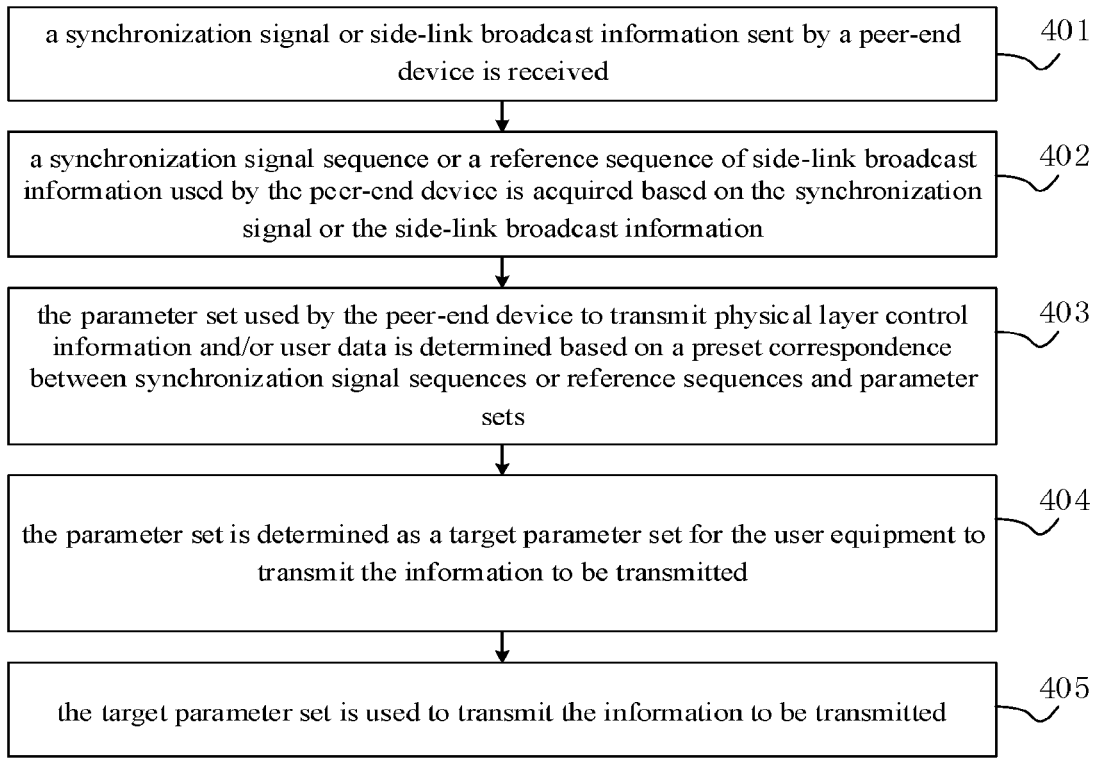
FIG. 4 is a flowchart of a method for acquiring a parameter set according to an exemplary embodiment.

FIG. 4 is a flowchart of a method for acquiring a parameter set according to an exemplary embodiment. As illustrated in FIG. 4, based on the embodiments described with reference to FIG. 1, the method for acquiring a parameter set includes the following steps 401-405.

At block 401, a synchronization signal or side-link broadcast information sent by a peer-end device is received.

At block 402, a synchronization signal sequence or a reference sequence of side-link broadcast information used by the peer-end device is acquired based on the synchronization signal or the side-link broadcast information.

At block 403, the parameter set used by the peer-end device to transmit physical layer control information and/or user data is determined based on a preset correspondence between the synchronization signal sequence or the reference sequence of side-link broadcast information and the parameter set.

At block 404, the parameter set is determined as a target parameter set for the user equipment to transmit the information to be transmitted.

At block 405, the target parameter set is used to transmit the information to be transmitted.

In the technical solution according to the present disclosure, for the NR V2x side-link communication, different synchronization signal sequences or reference sequences of broadcast information are adopted for the parameter sets used by the peer-end device to transmit different physical layer control information and/or user data. By pre-establishing the correspondence between the synchronization signal sequence or the reference sequence of side-link broadcast information and the parameter set, the user equipment may determine the parameter set used by the peer-end device to transmit the physical layer control information and/or the user data based on the preset correspondence between the synchronization signal sequence or the reference sequence of side-link broadcast information and the parameter set, and further determine the target parameter set used by the user equipment to transmit the information to be transmitted, so as to provide differentiated parameters for different V2x side-link communications and to guarantee the differentiated QOS requirements for NR V2x side-link communication services.

Device embodiments of the present disclosure will be described below, which may be used to implement the method embodiments of the present disclosure.

Figure 5:
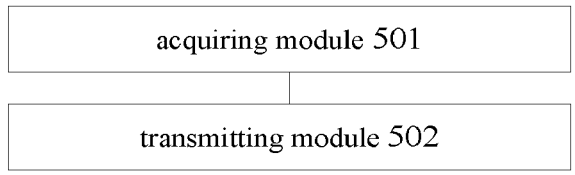
FIG. 5 is a block diagram of a device for acquiring a parameter set according to an exemplary embodiment.

FIG. 5 is a block diagram of a device for acquiring a parameter set according to an example embodiment. The device may be implemented as a part or all of a user equipment through software, hardware or a combination of both. As illustrated in FIG. 5, the device can include an acquiring module 501 and a transmitting module 502. Of course, it should be understood that one or more of the modules described in this disclosure can be implemented by hardware, such as circuitry.

The acquiring module 501 is configured to acquire a target parameter set corresponding to information to be transmitted, in which the information to be transmitted includes at least one of or any combination of following information types: a synchronization signal, side-link broadcast information, physical layer control information or user data. The transmitting module 502 is configured to transmit the information to be transmitted by using the target parameter set.

With the device according to the embodiment of the present disclosure, by supporting various parameter set configurations in NR V2x side-link communications and transmitting the information to be transmitted using the target parameter set corresponding to the information to be transmitted, differentiated parameter sets can be provided for different V2x side-link communications, which may guarantee differentiated QoS requirements for NR V2x side-link communication services and improve user experience.

Figure 6:
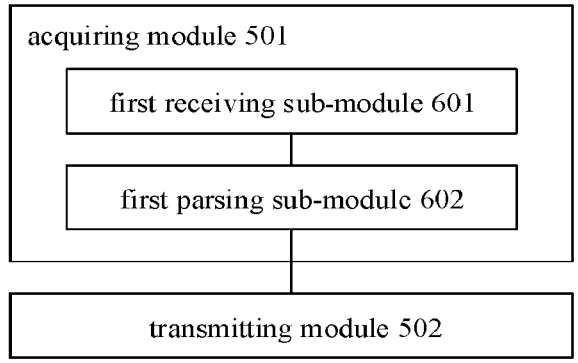
FIG. 6 is a block diagram of a device for acquiring a parameter set according to an exemplary embodiment.

In an embodiment, as illustrated in FIG. 6, based on the device shown in FIG. 5, the acquiring module 501 may be configured to include: a first receiving sub-module 601 and a first parsing sub-module 602. The first receiving sub-module 601 is configured to receive configuration information sent by a base station, in which the configuration information includes the target parameter set for the user equipment to transmit the information to be transmitted. The first parsing sub-module 602 is configured to parse the configuration information to obtain the target parameter set corresponding to the information to be transmitted.

Figure 7:
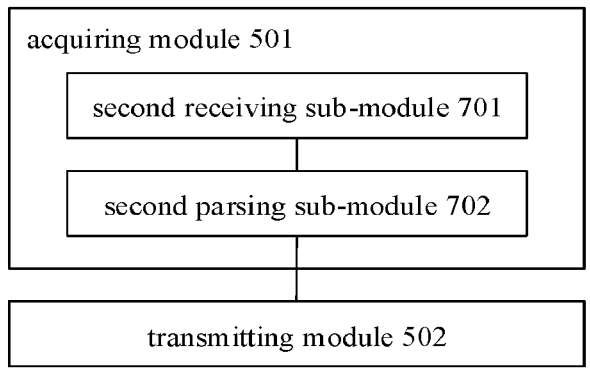
FIG. 7 is a block diagram of a device for acquiring a parameter set according to an exemplary embodiment.

In an embodiment, as illustrated in FIG. 7, based on the device shown in FIG. 5, the acquiring module 501 may be configured to include: a second receiving sub-module 701 and a second parsing sub-module 702. The second receiving sub-module 701 is configured to receive downlink control information sent by a base station, in which the downlink control information includes the target parameter set for the user equipment to transmit the information to be transmitted. The second parsing sub-module 702 is configured to parse the downlink control information to obtain the target parameter set corresponding to the information to be transmitted.

Figure 8:
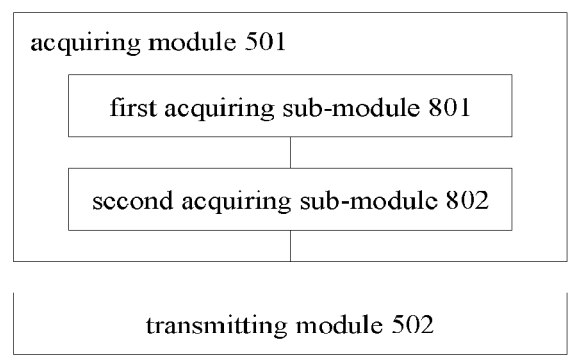
FIG. 8 is a block diagram of a device for acquiring a parameter set according to an exemplary embodiment.

In an embodiment, as illustrated in FIG. 8, based on the device shown in FIG. 5, the acquiring module 501 may be configured to include: a first acquiring sub-module 801 and a second acquiring sub-module 802. The first acquiring sub-module 801 is configured to acquire a target carrier frequency band for transmitting the information to be transmitted. The second acquiring sub-module 802 is configured to acquire the target parameter set corresponding to the target carrier frequency band based on a preset correspondence between carrier frequency bands and parameter sets.

In an embodiment, the acquiring module 501 is configured to acquire the target parameter set corresponding to the information to be transmitted based on a preset correspondence between information types and parameter sets.

In an embodiment, the acquiring module 501 is configured to acquire a time-frequency resource set for transmitting the information to be transmitted, and acquire the target parameter set corresponding to the time-frequency resource set based on a preset correspondence between time-frequency resource sets and parameter sets.

Figure 9:
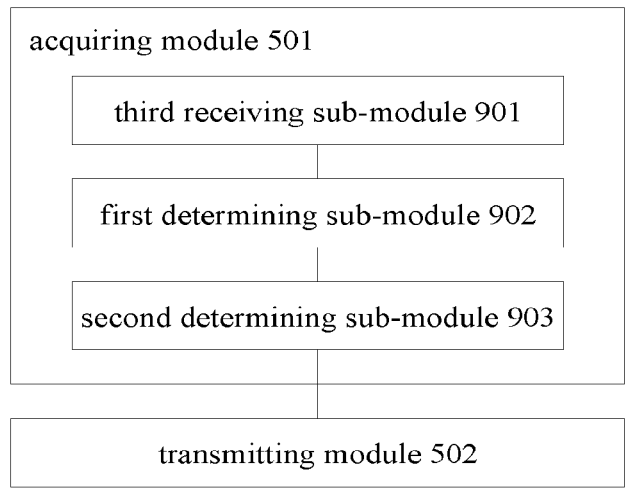
FIG. 9 is a block diagram of a device for acquiring a parameter set according to an exemplary embodiment.

In an embodiment, as illustrated in FIG. 9, based on the device shown in FIG. 5, the acquiring module 501 may be configured to include: a third receiving sub-module 901, a first determining sub-module 902 and a second determining sub-module 903. The third receiving sub-module 901 is configured to receive a synchronization signal or side-link broadcast information sent by a peer-end device. The first determining sub-module 902 is configured to determine a parameter set used by the peer-end device to transmit physical layer control information and/or user data based on the synchronization signal or the side-link broadcast information. The second determining sub-module 903 is configured to determine the parameter set as the target parameter set for the user equipment to transmit the information to be transmitted.

In an embodiment, the first determining sub-module 902 is further configured to detect a parameter set used by the peer-end device when sending the synchronization signal or the side-link broadcast information, and determine the parameter set used by the peer-end device to transmit the physical layer control information and/or the user data based on the parameter set used by the peer-end device when sending the synchronization signal or the side-link broadcast information.

In an embodiment, the first determining sub-module 902 is further configured to acquire a synchronization signal sequence or a reference sequence of side-link broadcast information used by the peer-end device based on the synchronization signal or the side-link broadcast information, and determine the parameter set used by the peer-end device to transmit the physical layer control information and/or the user data based on a preset correspondence between the synchronization signal sequence or the reference sequence of side-link broadcast information and the parameter set.

In an embodiment, the synchronization signal or the side-link broadcast information sent by the peer-end device includes first indication information indicating the parameter set used by the peer-end device to transmit the physical layer control information and/or the user data, and the first determining sub-module 902 is further configured to parse the synchronization signal or the side-link broadcast information sent by the peer-end device to obtain the parameter set used by the peer-end device to transmit the physical layer control information and/or the user data.

Figure 10:
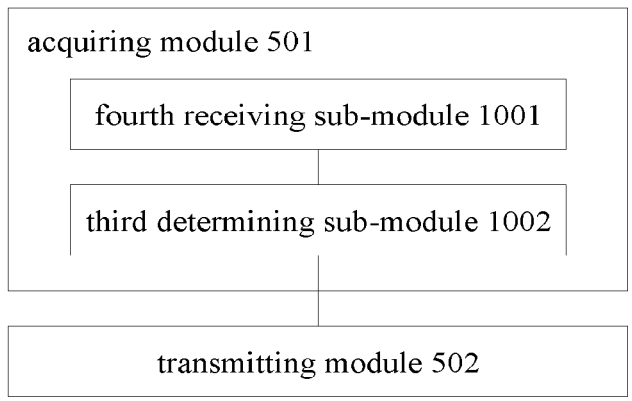
FIG. 10 is a block diagram of a device for acquiring a parameter set according to an exemplary embodiment.

In an embodiment, as illustrated in FIG. 10, based on the device shown in FIG. 5, the acquiring module 501 may be configured to include: a fourth receiving sub-module 1001 and a third determining sub-module 1002. The fourth receiving sub-module 1001 is configured to receive a synchronization signal or side-link broadcast information sent by a peer-end device. The third determining sub-module 1002 is configured to, when the synchronization signal sent by the peer-end device is determined as a synchronization reference signal for the user equipment to send signals, determine the parameter set used by the peer-end device to send the synchronization signal or the side-link broadcast information as the target parameter set used by the user equipment to send the synchronization signal or the side-link broadcast information.

In an embodiment, the acquiring module 501 is configured to receive physical layer control information sent by a peer-end device, in which the physical layer control information carries second indication information indicating a parameter set used when transmitting user data and/or feedback information: and parse the physical layer control information to obtain the target parameter set used by the user equipment when transmitting the user data and/or the feedback information.

In an example embodiment, a device for acquiring a parameter set is provided. The device can include a processor and a memory configured to store instructions executable by the processor. The processor can be configured to acquire a target parameter set corresponding to information to be transmitted. The information to be transmitted includes at least one of or any combination of following information types: a synchronization signal, side-link broadcast information, physical layer control information or user data. The processor can be further configured to transmit the information to be transmitted by using the target parameter set.

The processor is further configured to receive configuration information sent by a base station, in which the configuration information includes the target parameter set for the user equipment to transmit the information to be transmitted, and parse the configuration information to obtain the target parameter set corresponding to the information to be transmitted.

Additionally, the processor is further configured to receive downlink control information sent by a base station, in which the downlink control information includes the target parameter set for the user equipment to transmit the information to be transmitted, and parse the downlink control information to obtain the target parameter set corresponding to the information to be transmitted.

The processor is further configured to acquire a target carrier frequency band for transmitting the information to be transmitted, and acquire the target parameter set corresponding to the target carrier frequency band based on a preset correspondence between carrier frequency bands and parameter sets.

The processor is further configured to acquire the target parameter set corresponding to the information to be transmitted based on a preset correspondence between information types and parameter sets. Additionally, the processor can be further configured to acquire a time-frequency resource set for transmitting the information to be transmitted, and acquire the target parameter set corresponding to the time-frequency resource set based on a preset correspondence between time-frequency resource sets and parameter sets.

The processor is further configured to receive a synchronization signal or side-link broadcast information sent by a peer-end device, determine a parameter set used by the peer-end device to transmit physical layer control information and/or user data based on the synchronization signal or the side-link broadcast information, and determine the parameter set as the target parameter set for the user equipment to transmit the information to be transmitted.

The processor is further configured to: detect a parameter set used by the peer-end device when sending the synchronization signal or the side-link broadcast information, and determine the parameter set used by the peer-end device to transmit the physical layer control information and/or the user data based on the parameter set used by the peer-end device when sending the synchronization signal or the side-link broadcast information.

The processor is further configured to: acquire a synchronization signal sequence or a reference sequence of side-link broadcast information used by the peer-end device based on the synchronization signal or the side-link broadcast information, and determine the parameter set used by the peer-end device to transmit the physical layer control information and/or the user data based on a preset correspondence between the synchronization signal sequence or the reference sequence of side-link broadcast information and the parameter set.

The synchronization signal or the side-link broadcast information sent by the peer-end device includes first indication information indicating the parameter set used by the peer-end device to transmit the physical layer control information and/or the user data. The processor is further configured to parse the synchronization signal or the side-link broadcast information sent by the peer-end device to obtain the parameter set used by the peer-end device to transmit the physical layer control information and/or the user data.

Additionally, the processor can be further configured to receive a synchronization signal or side-link broadcast information sent by a peer-end device: and when the synchronization signal sent by the peer-end device is determined as a synchronization reference signal for the user equipment to send signals, determine the parameter set used by the peer-end device to send the synchronization signal or the side-link broadcast information as the target parameter set used by the user equipment to send the synchronization signal or the side-link broadcast information.

The processor is further configured to receive physical layer control information sent by a peer-end device, in which the physical layer control information carries second indication information indicating a parameter set used when transmitting user data and/or feedback information, and parse the physical layer control information to obtain the target parameter set used by the user equipment when transmitting the user data and/or the feedback information.

Regarding the device in the foregoing embodiments, the specific manner in which each module performs corresponding operations has been described in detail in the method embodiments, and detailed description will not be given here.

Figure 11:
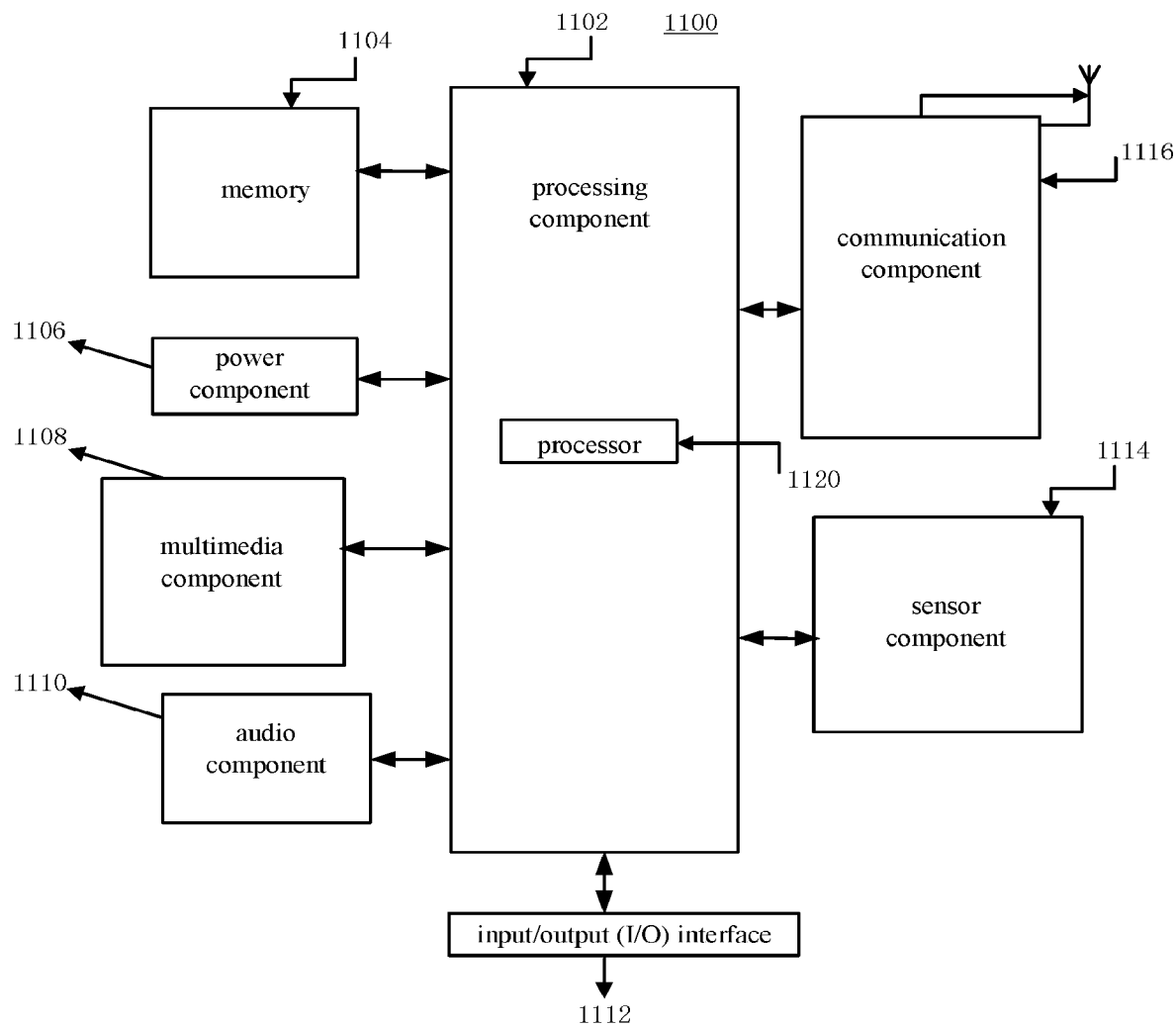
FIG. 11 is a block diagram of a device for acquiring a parameter set according to an exemplary embodiment.

FIG. 11 is a block diagram of a device for acquiring a parameter set according to an example embodiment. The device for acquiring a parameter set 1100 is suitable for a user equipment based on a side-link communication. The device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. When the device 1100 is in an operation mode, such as in a shooting mode or a video mode, the front camera and/or the rear camera receives external multimedia data. Each front camera and rear camera can be a fixed optical lens system or have focal length and optical zoom capabilities.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on any communication standard, such as Wi-Fi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1104, executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

Figure 12:
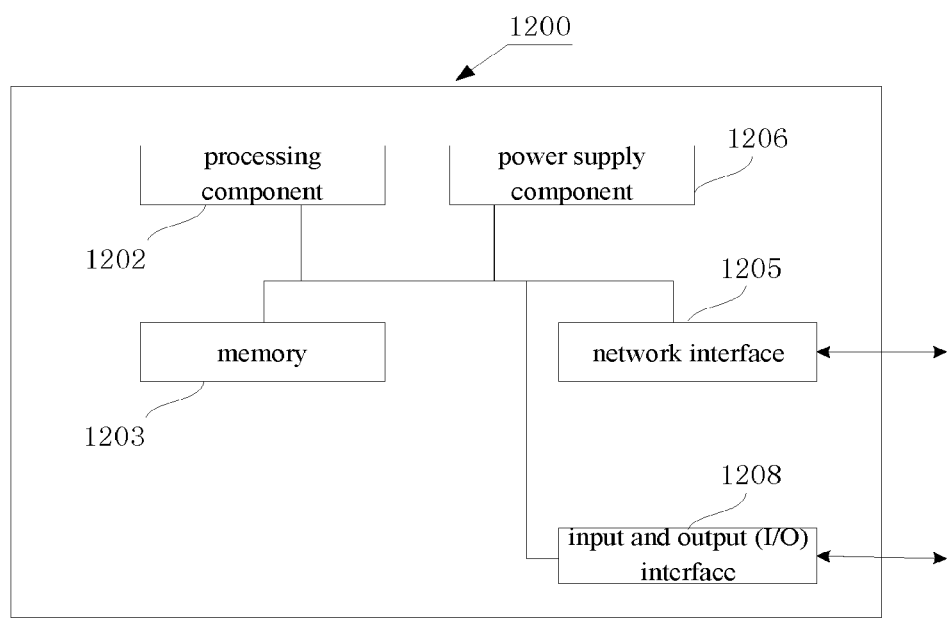
FIG. 12 is a block diagram of a device for acquiring a parameter set according to an exemplary embodiment.

FIG. 12 is a block diagram of a device 1200 for acquiring a parameter set according to an example embodiment. For example, the device 1200 may be provided as a server. The device 1200 includes a processing component 1202, which further includes one or more processors, and a memory resource represented by a memory 1203 for storing instructions executable by the processing component 1202, such as application programs. The application program stored in the memory 1203 may include one or more modules each corresponding to a set of instructions. In addition, the processing component 1202 is configured to execute instructions to perform the above methods.

The device 1200 may further include a power supply component 1206 configured to perform power management of the device 1200, a wired or wireless network interface 1205 configured to connect the device 1200 to the network, and an input and output (I/O) interface 1208. The device 1200 could operate based on an operating system stored in the memory 1203, such as Windows Server™, Mac OS X™, Unix™, Linux™, FreeBSD™ or the like.

A non-transitory computer-readable storage medium is provided. When the instructions in the storage medium are executed by the processor of the device 1100 or the device 1200, the device 1100 or the device 1200 could execute the following method that can be applied to the user equipment based on a side-link communication. The method can include acquiring a target parameter set corresponding to information to be transmitted, in which the information to be transmitted includes at least one of or any combination of following information types: a synchronization signal, side-link broadcast information, physical layer control information or user data. The method can further include transmitting the information to be transmitted by using the target parameter set.

In an embodiment, acquiring the target parameter set corresponding to the information to be transmitted includes receiving configuration information sent by a base station, in which the configuration information includes the target parameter set for the user equipment to transmit the information to be transmitted, and parsing the configuration information to obtain the target parameter set corresponding to the information to be transmitted.

In an embodiment, acquiring the target parameter set corresponding to the information to be transmitted includes receiving downlink control information sent by a base station, in which the downlink control information includes the target parameter set for the user equipment to transmit the information to be transmitted, and parsing the downlink control information to obtain the target parameter set corresponding to the information to be transmitted.

In an embodiment, acquiring the target parameter set corresponding to the information to be transmitted includes acquiring a target carrier frequency band for transmitting the information to be transmitted: and acquiring the target parameter set corresponding to the target carrier frequency band based on a preset correspondence between carrier frequency bands and parameter sets.

In an embodiment, acquiring the target parameter set corresponding to the information to be transmitted includes acquiring the target parameter set corresponding to the information to be transmitted based on a preset correspondence between information types and parameter sets.

In an embodiment, acquiring the target parameter set corresponding to the information to be transmitted includes acquiring a time-frequency resource set for transmitting the information to be transmitted, and acquiring the target parameter set corresponding to the time-frequency resource set based on a preset correspondence between time-frequency resource sets and parameter sets.

In an embodiment, acquiring the target parameter set corresponding to the information to be transmitted includes receiving a synchronization signal or side-link broadcast information sent by a peer-end device, determining a parameter set used by the peer-end device to transmit physical layer control information and/or user data based on the synchronization signal or the side-link broadcast information, and determining the parameter set as the target parameter set for the user equipment to transmit the information to be transmitted.

In an embodiment, determining the parameter set used by the peer-end device to transmit the physical layer control information and/or the user data based on the synchronization signal or the side-link broadcast information includes detecting a parameter set used by the peer-end device when sending the synchronization signal or the side-link broadcast information, and determining the parameter set used by the peer-end device to transmit the physical layer control information and/or the user data based on the parameter set used by the peer-end device when sending the synchronization signal or the side-link broadcast information.

In an embodiment, determining the parameter set used by the peer-end device to transmit the physical layer control information and/or the user data based on the synchronization signal or the side-link broadcast information includes acquiring a synchronization signal sequence or a reference sequence of side-link broadcast information used by the peer-end device based on the synchronization signal or the side-link broadcast information, and determining the parameter set used by the peer-end device to transmit the physical layer control information and/or the user data based on a preset correspondence between the synchronization signal sequence or the reference sequence of side-link broadcast information and the parameter set.

In an embodiment, determining the parameter set used by the peer-end device to transmit the physical layer control information and/or the user data based on the synchronization signal or the side-link broadcast information includes the synchronization signal or the side-link broadcast information sent by the peer-end device including first indication information indicating the parameter set used by the peer-end device to transmit the physical layer control information and/or the user data, and parsing the synchronization signal or the side-link broadcast information sent by the peer-end device to obtain the parameter set used by the peer-end device to transmit the physical layer control information and/or the user data.

In an embodiment, acquiring the target parameter set corresponding to the information to be transmitted includes receiving a synchronization signal or side-link broadcast information sent by a peer-end device, and when the synchronization signal sent by the peer-end device is determined as a synchronization reference signal for the user equipment to send signals, determining the parameter set used by the peer-end device to send the synchronization signal or the side-link broadcast information as the target parameter set used by the user equipment to send the synchronization signal or the side-link broadcast information.

In an embodiment, acquiring the target parameter set corresponding to the information to be transmitted includes receiving physical layer control information sent by a peer-end device, in which the physical layer control information carries second indication information indicating a parameter set used when transmitting user data and/or feedback information, and parsing the physical layer control information to obtain the target parameter set used by the user equipment when transmitting the user data and/or the feedback information.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for acquiring a parameter set that is applicable to user equipment for a side-link communication, comprising:
    acquiring a target parameter set corresponding to information to be transmitted, the information to be transmitted having an information type that is at least one of a synchronization signal, side-link broadcast information, physical layer control information or user data, wherein the target parameter set is used for the side-link communication, the target parameter set comprises a value of a parameter for transmitting the information to be transmitted, and the parameter at least comprises a cyclic prefix corresponding to a subcarrier interval; and
    transmitting the information to be transmitted by using the target parameter set;
    wherein acquiring the target parameter set further comprises:
        receiving downlink control information sent by a base station, the downlink control information including the target parameter set for the user equipment to transmit the information to be transmitted; and
        parsing the downlink control information to obtain the target parameter set corresponding to the information to be transmitted.

2. The method according to claim 1, wherein acquiring the target parameter set further comprises:
    receiving configuration information sent by a base station, the configuration information including the target parameter set for the user equipment to transmit the information to be transmitted; and
    parsing the configuration information to obtain the target parameter set corresponding to the information to be transmitted.

3. The method according to claim 1, wherein acquiring the target parameter set further comprises:
    acquiring a target carrier frequency band for transmitting the information to be transmitted; and
    acquiring the target parameter set corresponding to the target carrier frequency band based on a preset correspondence between carrier frequency bands and parameter sets.

4. The method according to claim 1, wherein acquiring the target parameter set further comprises:
    acquiring the target parameter set corresponding to the information to be transmitted based on a preset correspondence between information types and parameter sets.

5. The method according to claim 1, wherein acquiring the target parameter set further comprises:
acquiring a time-frequency resource set for transmitting the information to be transmitted; and
acquiring the target parameter set corresponding to the time-frequency resource set based on a preset correspondence between time-frequency resource sets and parameter sets.

6. The method according to claim 1, wherein acquiring the target parameter set further comprises:
receiving a synchronization signal or side-link broadcast information sent by a peer-end device;
determining a parameter set used by the peer-end device to transmit at least one of physical layer control information or user data based on the synchronization signal or the side-link broadcast information; and
determining the parameter set as the target parameter set for the user equipment to transmit the information to be transmitted.

7. The method according to claim 6, wherein determining the parameter set used by the peer-end device further comprises:
detecting a parameter set used by the peer-end device when sending the synchronization signal or the side-link broadcast information; and
determining the parameter set used by the peer-end device to transmit the at least one of the physical layer control information or the user data based on the parameter set used by the peer-end device when sending the synchronization signal or the side-link broadcast information.

8. The method according to claim 6, wherein determining the parameter set used by the peer-end device further comprises:
acquiring a synchronization signal sequence or a reference sequence of side-link broadcast information used by the peer-end device based on the synchronization signal or the side-link broadcast information; and
determining the parameter set used by the peer-end device to transmit the at least one of the physical layer control information or the user data based on a preset correspondence between the synchronization signal sequence or the reference sequence of side-link broadcast information and the parameter set.

9. The method according to claim 6, wherein the synchronization signal or the side-link broadcast information sent by the peer-end device includes first indication information indicating the parameter set used by the peer-end device to transmit the at least one of the physical layer control information or the user data, and the determining the parameter set used by the peer-end device to transmit the at least one of the physical layer control information or the user data based on the synchronization signal or the side-link broadcast information further comprises:
parsing the synchronization signal or the side-link broadcast information sent by the peer-end device to obtain the parameter set used by the peer-end device to transmit the at least one of the physical layer control information or the user data based on the first indication information.

10. The method according to claim 1, wherein acquiring the target parameter set corresponding to the information to be transmitted further comprises:
receiving a synchronization signal or side-link broadcast information sent by a peer-end device; and
determining the parameter set used by the peer-end device to send the synchronization signal or the side-link broadcast information as the target parameter set used by the user equipment to send the synchronization signal or the side-link broadcast information when the synchronization signal sent by the peer-end device is determined as a synchronization reference signal for the user equipment to send signals.

11. The method according to claim 1, wherein acquiring the target parameter set corresponding to the information to be transmitted comprises:
receiving physical layer control information sent by a peer-end device, the physical layer control information carrying second indication information indicating a parameter set used when transmitting at least one of user data or feedback information; and
parsing the physical layer control information to obtain the target parameter set used by the user equipment when transmitting the at least one of the user data or the feedback information.

12. A device for acquiring a parameter set, comprising:
a processor;
a memory configured to store instructions executable by the processor,
wherein the processor is configured to:
acquire a target parameter set corresponding to information to be transmitted, the information to be transmitted having an information type that is at least one of a synchronization signal, side-link broadcast information, physical layer control information, or user data, wherein the target parameter set is used for the side-link communication, the target parameter set comprises a value of a parameter for transmitting the information to be transmitted, and the parameter at least comprises a cyclic prefix corresponding to a subcarrier interval; and
transmit the information to be transmitted by using the target parameter set;
wherein the processor is further configured to acquire the target parameter set corresponding to the information to be transmitted by:
receiving downlink control information sent by a base station, wherein the downlink control information comprises including the target parameter set for the user equipment to transmit the information to be transmitted; and
parsing the downlink control information to obtain the target parameter set corresponding to the information to be transmitted.

13. The device according to claim 12, wherein the processor is further configured to acquire the target parameter set corresponding to the information to be transmitted by:
receiving configuration information sent by a base station, wherein the configuration information comprises including the target parameter set for the user equipment to transmit the information to be transmitted; and
parsing the configuration information to obtain the target parameter set corresponding to the information to be transmitted.

14. The device according to claim 12, wherein the processor is further configured to acquire the target parameter set corresponding to the information to be transmitted by:
acquiring a target carrier frequency band for transmitting the information to be transmitted; and
acquiring the target parameter set corresponding to the target carrier frequency band based on a preset correspondence between carrier frequency bands and parameter sets.

15. The device according to claim 12, wherein the processor is further configured to acquire the target parameter set corresponding to the information to be transmitted by:

acquiring the target parameter set corresponding to the information to be transmitted based on a preset correspondence between information types and parameter sets.

16. The device according to claim 12, wherein the processor is further configured to acquire the target parameter set corresponding to the information to be transmitted by:

acquiring a time-frequency resource set for transmitting the information to be transmitted; and acquiring the target parameter set corresponding to the time-frequency resource set based on a preset correspondence between time-frequency resource sets and parameter sets.

17. The device according to claim 12, wherein the processor is further configured to acquire the target parameter set corresponding to the information to be transmitted by:

receiving a synchronization signal or side-link broadcast information sent by a peer-end device;

determining a parameter set used by the peer-end device to transmit at least one of physical layer control information and/or user data based on the synchronization signal or the side-link broadcast information; and determining the parameter set as the target parameter set for the user equipment to transmit the information to be transmitted.

18. A non-transitory computer-readable storage medium having computer instructions stored thereon that, when executed by a processor, cause the processor to perform operations comprising:

acquiring a target parameter set corresponding to information to be transmitted, the information to be transmitted having an information type that is at least one of a synchronization signal, side-link broadcast information, physical layer control information or user data, wherein the target parameter set is used for the side-link communication, the target parameter set comprises a value of a parameter for transmitting the information to be transmitted, and the parameter at least comprises a cyclic prefix corresponding to a subcarrier interval; and transmitting the information to be transmitted by using the target parameter set;

wherein the processor is further caused to acquire the target parameter set corresponding to the information to be transmitted by:

receiving downlink control information sent by a base station, wherein the downlink control information comprises including the target parameter set for the user equipment to transmit the information to be transmitted; and parsing the downlink control information to obtain the target parameter set corresponding to the information to be transmitted.

\* \* \* \* \*